(12) United States Patent
Hetherington et al.

(10) Patent No.: US 12,341,876 B2
(45) Date of Patent: Jun. 24, 2025

(54) CRYPTOGRAPHIC KEY MANAGEMENT AND TRANSFER

(71) Applicant: BKey, Inc., Schaumburg, IL (US)

(72) Inventors: Mark D. Hetherington, Crystal Lake, IL (US); Jorn Lyseggen, London (GB); Edgardo M. Cruz-Zeno, Round Lake, IL (US); Nai Sum Wong, Palatine, IL (US); Ming Dai, Buffalo Grove, IL (US)

(73) Assignee: BKey, Inc., Schaumburg, IL (US)

( * ) Notice: Subject to any disclaimer, the term of this patent is extended or adjusted under 35 U.S.C. 154(b) by 0 days.

(21) Appl. No.: 18/770,575

(22) Filed: Jul. 11, 2024

(65) Prior Publication Data

US 2025/0023716 A1    Jan. 16, 2025

Related U.S. Application Data (60) Provisional application No. 63/513,113, filed on Jul. 11, 2023.

(51) Int. Cl.
*H04L 29/06* (2006.01)
*G06F 21/00* (2013.01)
*H04L 9/08* (2006.01)

(52) U.S. Cl.
CPC ............ *H04L 9/083* (2013.01); *H04L 9/0869* (2013.01)

(58) Field of Classification Search
CPC ................................ H04L 9/083; H04L 9/086
See application file for complete search history.

(56) References Cited

U.S. PATENT DOCUMENTS

| | | | |
|---|---|---|---|
| 6,996,722 B1 * | 2/2006 | Fairman | H04L 63/0442 713/192 |
| 2015/0249687 A1 * | 9/2015 | O'Hare | H04L 9/321 726/3 |
| 2017/0244560 A1 * | 8/2017 | Brandstätter | H04L 9/0869 |
| 2017/0286669 A1 | 10/2017 | O'Hare et al. | |
| 2020/0005282 A1 | 1/2020 | Kim | |

OTHER PUBLICATIONS

International Search Report and Written Opinion in PCT/US2024/037676 mailed Oct. 1, 2024.

* cited by examiner

*Primary Examiner* — Lisa C Lewis
(74) *Attorney, Agent, or Firm* — Buchalter; Jason W. Croft (57) ABSTRACT

Technology is disclosed for a method that may comprise: identifying an owner key seed; identifying a receiver key seed; determining a delta between the owner key seed and the receiver key seed; and storing the delta with a trusted third party in a manner that is inaccessible by a receiver. The delta may be provided to the receiver based on a transfer condition being satisfied.

20 Claims, 12 Drawing Sheets

CRYPTOGRAPHIC KEY MANAGEMENT AND TRANSFER

RELATED APPLICATION

This application claims the benefit of U.S. Provisional Application No. 63/513,113, filed Jul. 11, 2023, the disclosure of which is incorporated herein by reference in its entirety.

This disclosure relates to improvements with cryptographic key management and transfer.

BACKGROUND

Unless otherwise indicated herein, the materials described herein are not prior art to the claims in the present application and are not admitted to be prior art by inclusion in this section.

A cryptographic key is a string of data that is used to lock or unlock cryptographic functions, including authentication, authorization and encryption. Cryptographic keys are used in many different areas, such as to encrypt sensitive data (e.g., bank transactions, private email, web-traffic, etc.), provide tamper-proof signing of documents, cryptocurrency, and so forth.

The subject matter claimed in the present disclosure is not limited to implementations that solve any disadvantages or that operate only in environments such as those described above. Rather, this background is only provided to illustrate one example technology area where some examples described in the present disclosure may be practiced.

SUMMARY

A method may include identifying an owner key seed; identifying a receiver key seed; determining a delta between the owner key seed and the receiver key seed; and storing the delta with a trusted third party in a manner that is inaccessible by a receiver, the delta being provided to the receiver based on a transfer condition being satisfied.

A method may include identifying a receiver key seed; receiving a delta from a trusted third party when a transfer condition is satisfied; and generating an owner key seed by operating on the receiver key seed and the delta using a difference operator.

A method may include identifying a delta between an owner key seed and a receiver key seed; and providing the delta to a receiver based on a transfer condition being satisfied. The delta may be operable to generate the owner key seed by operating on the receiver key seed and the delta using a difference operator.

The object and advantages of the examples will be realized and achieved at least by the elements, features, and combinations particularly pointed out in the claims. It is to be understood that both the foregoing general description and the following detailed description are exemplary and explanatory and are not restrictive of the invention, as claimed.

BRIEF DESCRIPTION OF THE DRAWINGS

Examples will be described and explained with additional specificity and detail through the use of the accompanying drawings in which.

DETAILED DESCRIPTION

Cryptographic keys may be symmetric or asymmetric. For symmetric cryptographic keys, both the sender and the receiver may use the same key. Asymmetric cryptographic key techniques, may use a public/private key pair, where the sender may encrypt with the receiver's public key, and the receiver may decrypt with his private key.

Cryptographic keys may be created randomly and stored on a device. Keys are to be well protected to avoid the keys from being exposed to an adversarial party. Key exposure means an attacker may gain access that is intended for the owner. Loss of keys may be problematic for many reasons because an owner may want to recover keys stored on a lost or stolen device. Loss of keys may mean loss of access to encrypted documents or cryptocurrency.

Transferring cryptographic keys would be useful. For example, because keys may become inaccessible due to death or incapacitation, transferring keys to heirs upon death would be useful. Moreover, it would be useful for keys to be transferrable to a designated Power of Attorney upon incapacitation.

Figure 1:
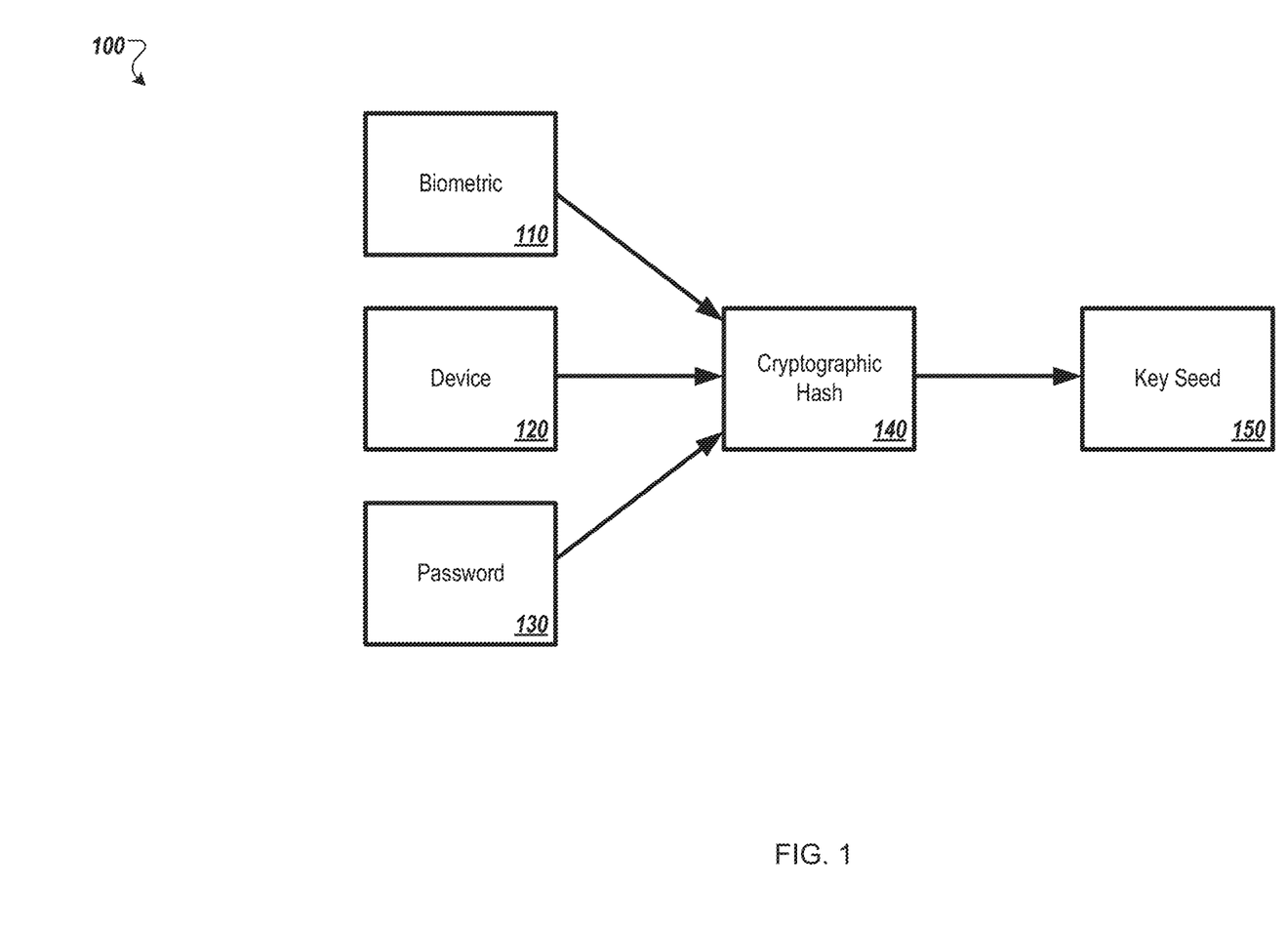
FIG. 1 illustrates an example block diagram for multifactor authentication.

Multi-factor keys offer enhanced security for a cryptographic key. The factors in a multi-factor authentication system could be any factor. As illustrated in the block diagram 100 in FIG. 1, examples include: (i) a biometric 110; (ii) a device 120 or near field communication (NFC)/Smart card; (iii) and a password 130 or personal identification number (PIN). The three factors (e.g., biometric 110, device 120, password 130) may be hashed using a cryptographic hash function 140 to generate a key seed 150. Therefore, keys may be provided when factors are matching.

Transferring ownership of cryptographic keys, such as those used for cryptocurrency wallets, may be problematic. Individuals with substantial crypto or other digital assets may want to pass these assets to a legal Power of Attorney (POA) in the event they become incapacitated. Individuals may also want to transfer assets upon death to designated heirs. Currently there are limited options for transferring keys. For custodial wallets, keys are maintained by an exchange or other designated company and can potentially be transferred to a designated party upon proof of death (e.g., by providing a death certificate) or POA. Custodial wallets may be unattractive to many owners since centralized storage of the private key may expose the key via attacks on the central server. As a result, many owners prefer to use offline key storage to improve the security of their keys.

Another approach is by using a keyword backup, which includes a list of keywords that may be used to recover the private key. Lists may be stored by the owner in a secure location such as a safe or safe deposit box. Keyword lists may be used to backup both online and offline keys, but keyword lists are to be carefully protected and may easily be lost or forgotten rendering the owner's assets inaccessible. Another shortcoming with the list of keywords approach is that there may not be legal protection if an unauthorized party, or an entity that is not yet authorized (e.g., heir, POA), gains access to the keyword list.

Aspects of the present disclosure address these and other problems with cryptographic keys. The present disclosure enhances the security of a key transfer to heirs or designated POA by preventing an heir or POA from access to the private key until legally authorized, preventing online storage of the key where it may be prone to attack, and/or preventing insecure offline storage of the key as may be done with keyword lists.

The present disclosure may use a multi-party transfer procedure where the receiver does not gain access to the key without certification of the transfer conditions by a trusted $3^{rd}$ party. In some examples, the trusted $3^{rd}$ party has to be trusted to certify that the conditions of transfer have been met and to release information to the receiver that allows them to unlock the key. In some examples, the information stored and released by the trusted $3^{rd}$ party may contain contextual information that is useful to the receiver so that attacks on the data stored by the trusted $3^{rd}$ party may not provide information that may be used to access the key and thus the owner's assets. Likewise, the trusted $3^{rd}$ party also does not have access to information that may be used to access the key and thus the owner's assets. The trusted $3^{rd}$ party may be an individual, or a technological entity that the original key owner either creates or configures to release the keys after certain transfer conditions have been satisfied.

In an example process, the owner's private key is generated from some entropy that is referred to as the key seed. The key seed may be randomly generated. The key seed may be manipulated into a public-private key pair according to an algorithm. The key seed may be manipulated into a symmetric key or any other kind of key. In some cases when the key is not stored, the key seed may be regenerative in order to produce the same keys from the same or similar entropy sources. For example, keys generated from passwords, biometrics, etc. may be subsequently regenerated when used. In other cases, the key seed may be discarded during the initial key creation process leaving the key itself. Likewise, the receiver may have their own keys and key seed generated from a different entropy source with the same characteristics as described above with respect to the owner's key(s) and key seed(s).

A method is provided for transferring a key from one party to another party. The method may include: identifying an owner key seed; identifying a receiver key seed; determining a delta between the owner key seed and the receiver key seed; and storing the delta with a trusted third party in a manner that is inaccessible by a receiver. The delta may be provided to the receiver based on a transfer condition being satisfied.

Examples of the present disclosure will be explained with reference to the accompanying drawings.

The key seed from either party (e.g., owner or receiver) may be a random number. A delta (i.e. difference) between two random numbers may itself be a random number. The key seed delta may contain information that is useful when one of the two key seeds (e.g., the owner key seed or the receiver key seed) is also present. The key seed delta may be held by a trusted $3^{rd}$ party and released once the transfer conditions are met. Without the key seed delta, the receiver may not have access to the owner's key.

Figure 2:
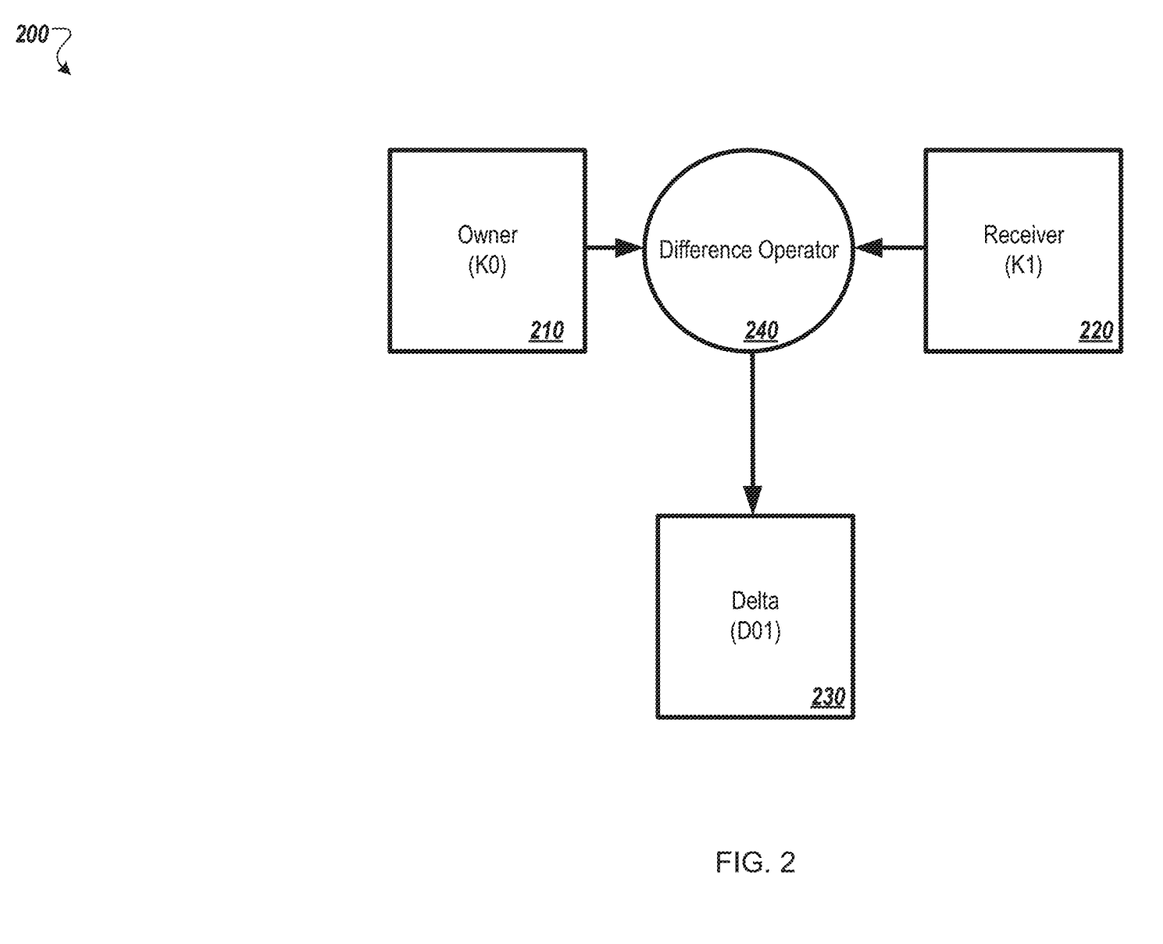
FIG. 2 illustrates an example block diagram for computing a delta based on an owner key and a receiver key.

As illustrated in the block diagram 200 in FIG. 2, an owner may have a key seed K0 210 and a receiver may have a key seed K1 220. When operated on by a difference operator 240 (e.g., XOR, XNOR, or the like), a delta D01 230 may be computed. That is, D01=K0^K1 in which '^' may be the difference operator.

When the conditions for transferring the owner key to the receiver are met, the trusted $3^{rd}$ party may release the delta to the receiver. With the delta from the trusted $3^{rd}$ party and the receiver's own key seed, the receiver may be able to recover the owner's key seed and thus will be able to access the assets associated with that key, including, in some examples, an ability to regenerate the owner key.

Figure 3:
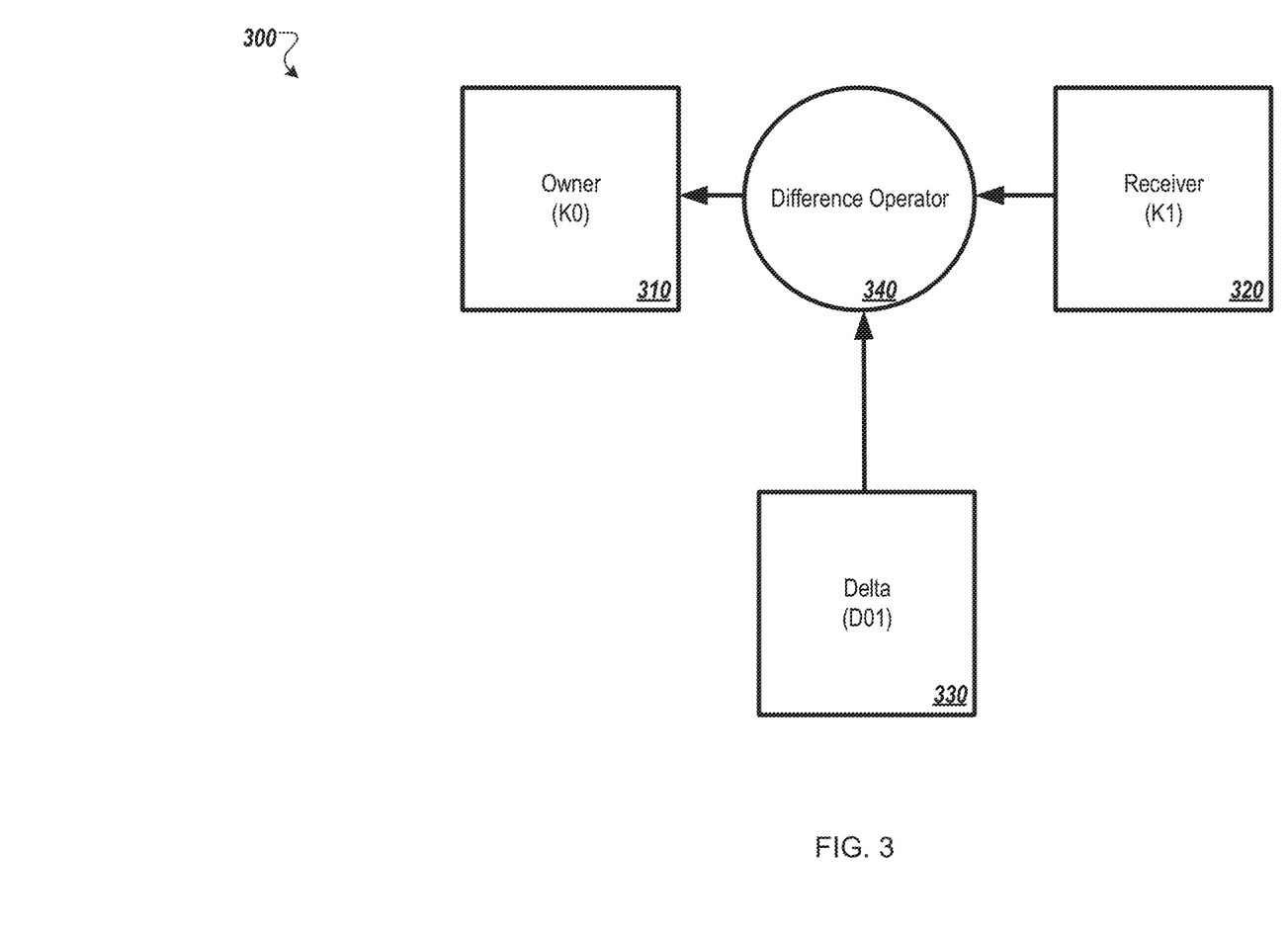
FIG. 3 illustrates an example block diagram for computing an owner key based on a receiver key and a delta.

As illustrated in the block diagram 300 in FIG. 3, a receiver may have a key seed K1 320 that may be operated on with the delta D01 330 using a difference operator 340 (e.g., XOR, XNOR, or the like) to generate the owner's key seed K0 310. That is, K0=D01^K1.

While the delta does not reveal any information about the owner or the receiver key seeds, in some cases additional protection may be desired. The delta may be encrypted using the receiver's public key, followed by the trusted $3^{rd}$ party's public key. When the transfer conditions have been met, the trusted $3^{rd}$ party may decrypt the encrypted delta and release it to the receiver. This is still encrypted using the receiver public key, which the receiver can then decrypt using their private key which provides the actual delta value. Alternatively, instead of using the receiver's public/private key pair, the encryption with the receiver key can also be performed using the receiver's symmetric key.

In an alternative example, the trusted $3^{rd}$ party may provide a random secret that may also be included in the delta. To protect the secret, the secret may be encrypted using the owner's public key and the owner may decrypt the secret with their private key. The owner's key seed, receiver's key seed, and the trusted $3^{rd}$ party secret may be combined, using a difference operator, to produce the delta. In this example, the combination of the delta and any two inputs (e.g., receiver's key seed and trusted $3^{rd}$ party secret) may produce the other input (e.g., owner's key seed). In this case, the delta may be stored either by the trusted $3^{rd}$ party, the receiver, or any other storage method that the receiver can gain access to. With access to the receiver key and the delta, the receiver still will not be able to reproduce the owner's key unless the trusted $3^{rd}$ party secret is also provided.

Figure 4:
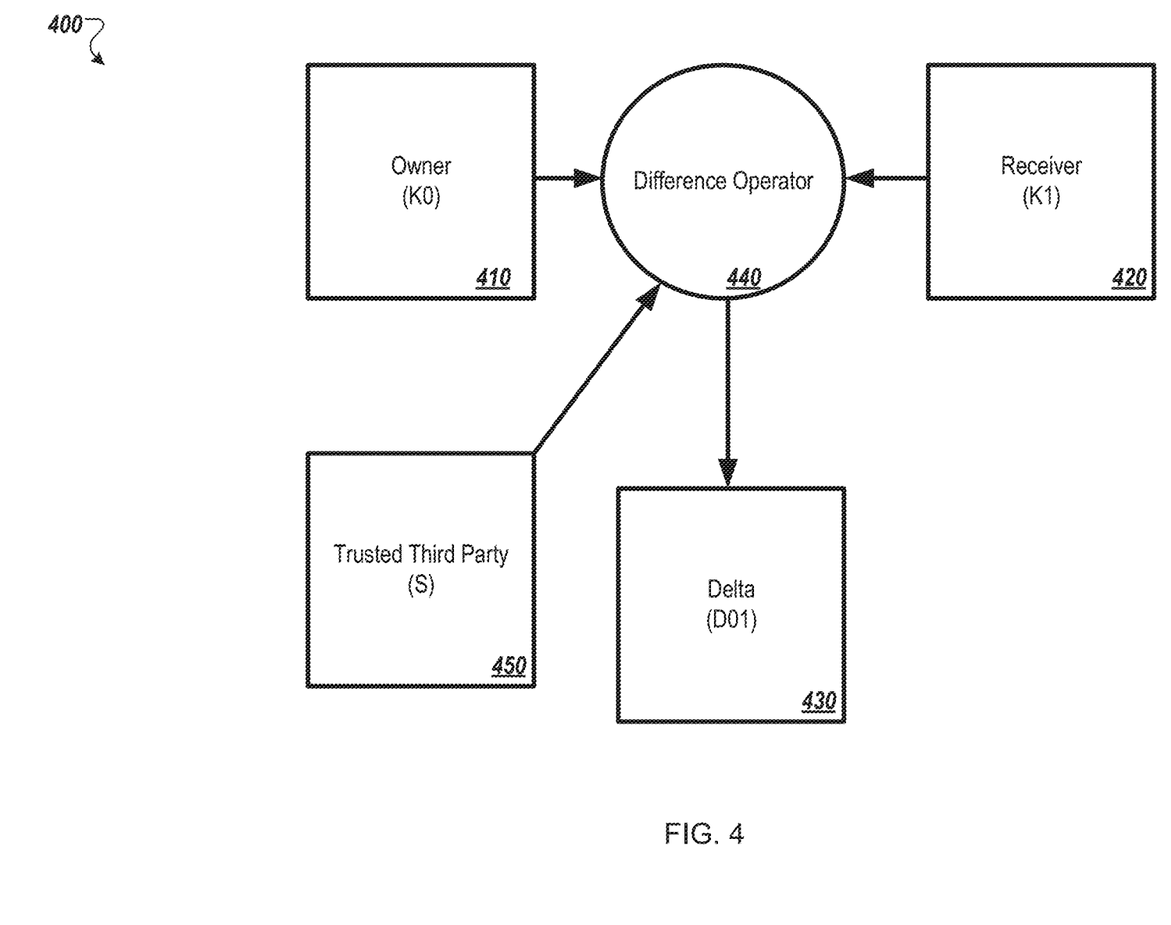
FIG. 4 illustrates an example block diagram for computing a delta based on an owner key, a receiver key, and a trusted $3^{rd}$ party secret.

As illustrated in the block diagram 400 in FIG. 4, the delta D01 430 may be computed by computing the difference operation on the owner's key seed K0 410, the receiver's key seed K1 420, and a secret S 450 of a trusted $3^{rd}$ party in which S may be encrypted using the owner's public key and may be decrypted using the owner's private key. That is, $D01 = S \wedge K0 \wedge K1$ where $S = D0(E0(S))$.

In situations where there are trusted $3^{rd}$ party secrets, to prevent the trusted $3^{rd}$ party secrets from being discovered from other transactions with that trusted $3^{rd}$ party, the trusted $3^{rd}$ party may choose to select different secrets randomly for each instance of key transference. In this case, the trusted $3^{rd}$ party may need to ensure that the secret provided for creation of the delta may be resent at the time of key transference.

Once the conditions for transfer have been verified by the trusted $3^{rd}$ party, the trusted third party secret may be sent to the receiver. To ensure that the secret is protected, the trusted $3^{rd}$ party may encrypt the secret with the receiver's public key and the receiver may decrypt the secret with their private key. The receiver may then combine their key seed, the stored delta, and the trusted $3^{rd}$ party secret in order to access the owner's key seed.

Figure 5:
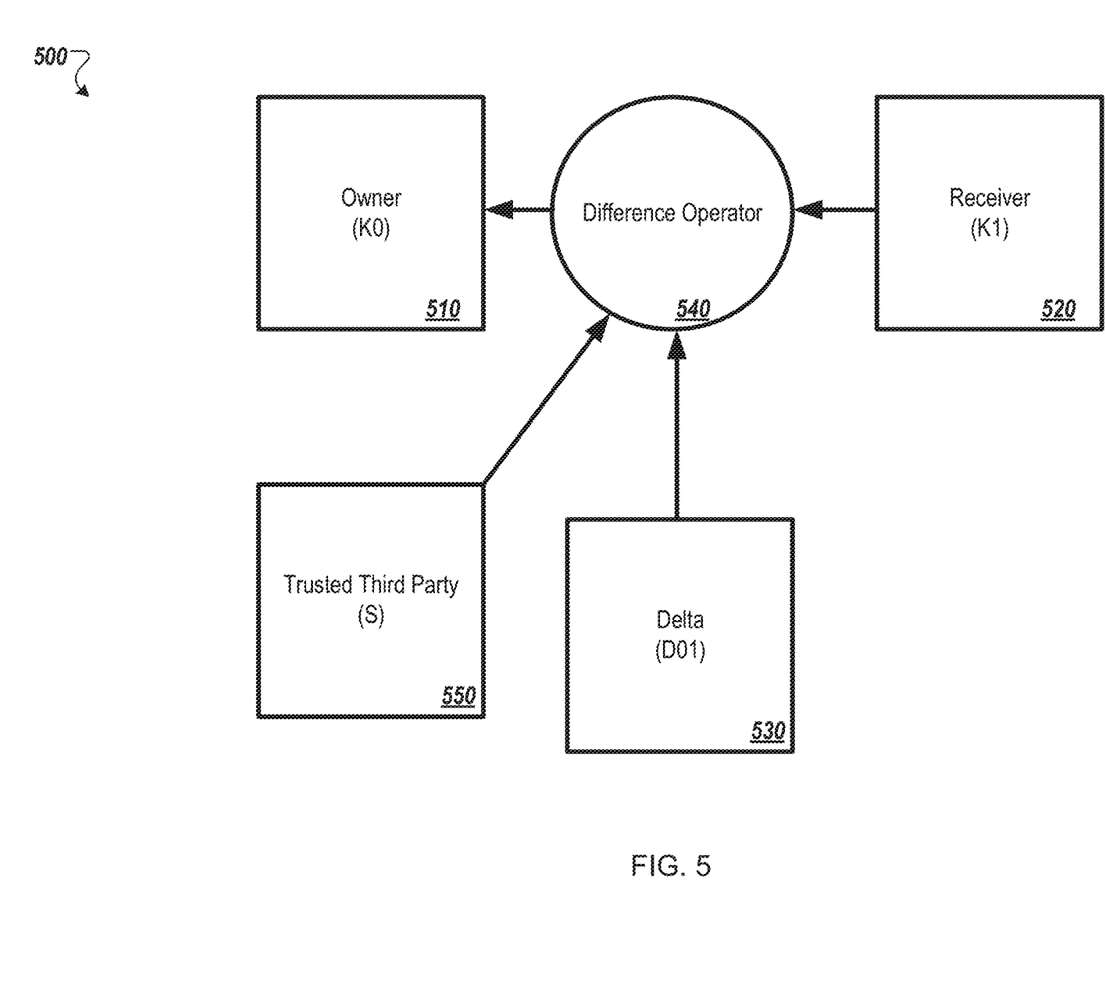
FIG. 5 illustrates an example block diagram for computing an owner key based on a receiver key, a delta, and a trusted $3^{rd}$ party secret.

As illustrated in the block diagram 500 in FIG. 5, the receiver key K1 520, the trusted $3^{rd}$ party secret S 550, and the delta D01 530 may be combined using the difference operator 540 to generate the owner's key K0 510. That is, $K0 = K1 \wedge S \wedge D01$.

Any number of trusted $3^{rd}$ parties may have a hand in verifying that the transfer conditions have been met. Each trusted $3^{rd}$ party may provide a secret that may be included in the computation. To protect the secrets, the secrets may be encrypted using the owner's public key and decrypted with the owner's private key. As with the single trusted $3^{rd}$ party, the delta may be stored by any of the trusted $3^{rd}$ parties or any other storage method that the receiver can access, but the delta may also be stored by the receiver themselves. The receiver may not use the delta to recover the owner's key seed without having access to the trusted $3^{rd}$ party secrets.

Figure 6:
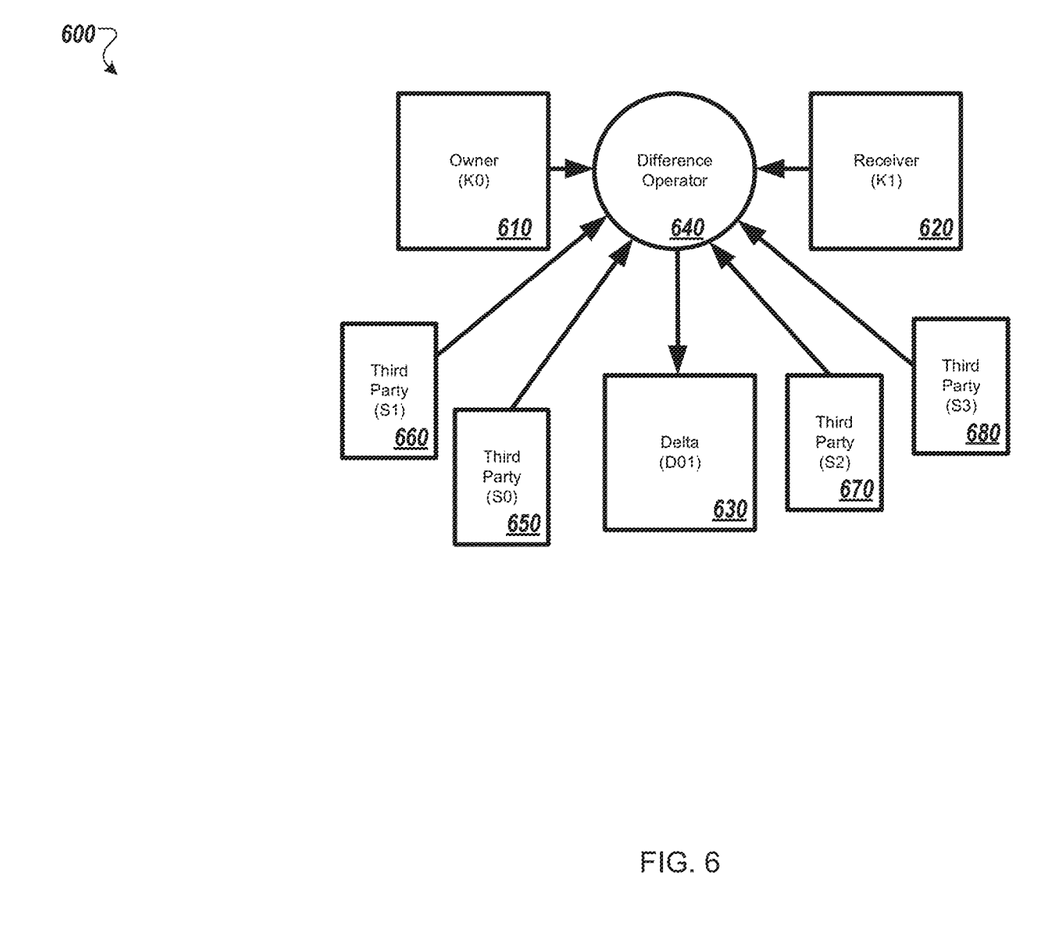
FIG. 6 illustrates an example block diagram for computing a delta based on an owner key, a receiver key, and a plurality of trusted $3^{rd}$ party secrets.

As illustrated in the block diagram 600 in FIG. 6, a delta D01 630 may be computed by operating on, using the difference operator (e.g., XOR, XNOR, or the like), the owner's key K0 610, the receiver's key K1 620, a first $3^{rd}$ party secret S0 650, a second $3^{rd}$ party secret S1 660, a third $3^{rd}$ party secret S2 670, and a fourth $3^{rd}$ party secret S3 680. That is, $D01 = K0 \wedge K1 \wedge S0 \wedge S1 \wedge S2 \wedge S3$.

Once the transfer conditions have been verified by the trusted $3^{rd}$ parties, each $3^{rd}$ party may provide their secret in order to unlock the owner's key seed. The secret for each trusted $3^{rd}$ party may be protected by each of the trusted $3^{rd}$ parties encrypting their secret with the receiver's public key and the receiver may then decrypt the secrets. The combination of the trusted $3^{rd}$ party secrets, the stored delta, and the receiver key seed may recover the owner key seed to gain access to the owner's assets. With this approach, the receiver may not gain access to the owner key unless the trusted $3^{rd}$ parties agree that the transfer conditions have been satisfied.

Figure 7:
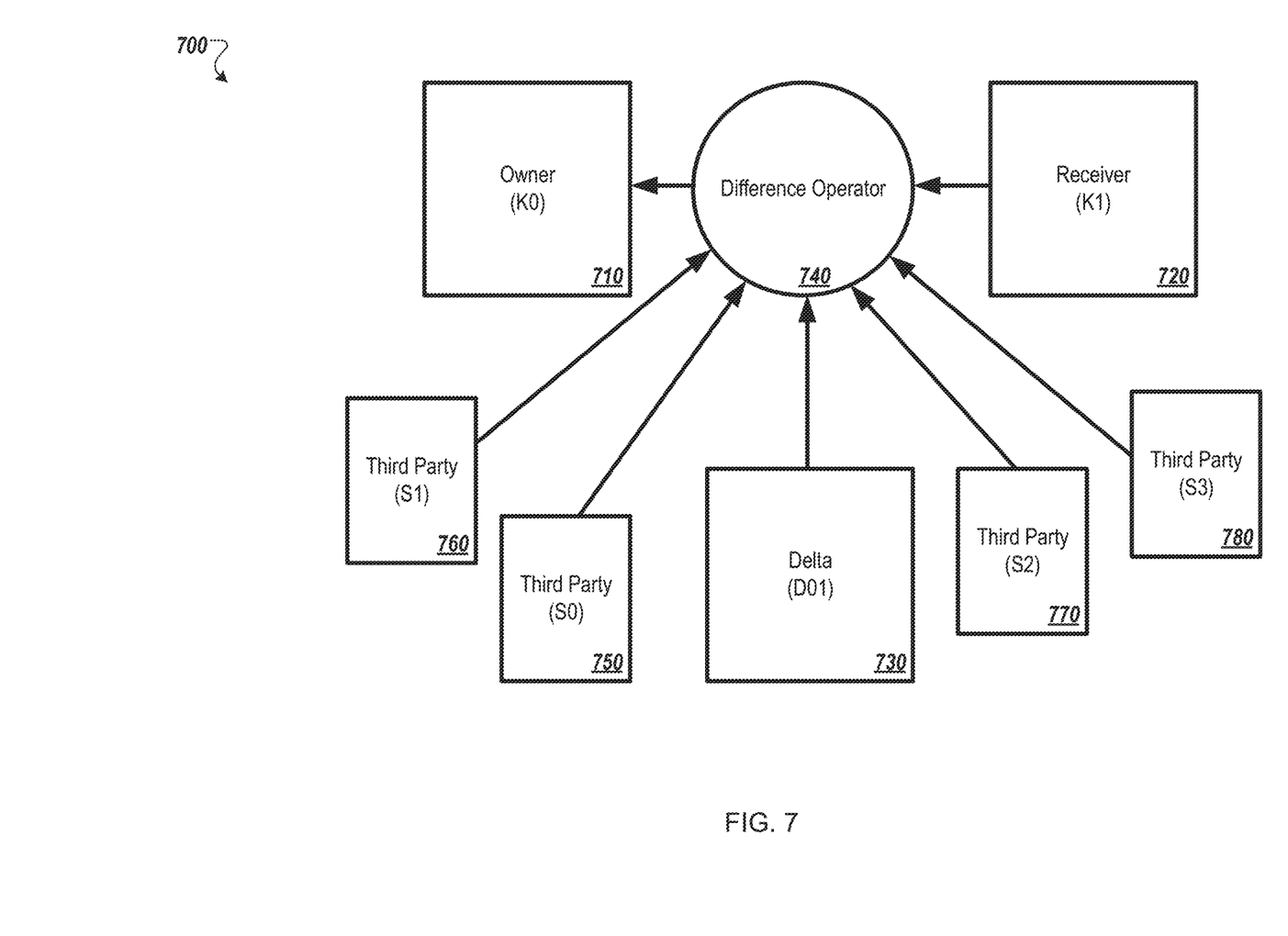
FIG. 7 illustrates an example block diagram for computing an owner key based on a receiver key, a delta, and a plurality of trusted $3^{rd}$ party secrets.

As illustrated in the block diagram 700 in FIG. 7, the receiver key K1 720, the delta D01 730, a first $3^{rd}$ party secret S0 750, a second $3^{rd}$ party secret S1 760, a third $3^{rd}$ party secret S2 770, and a fourth $3^{rd}$ party secret S3 780 may be combined, using a difference operator, to generate the owner's key K0 710. That is, $K0 = K1 \wedge D01 \wedge S0 \wedge S1 \wedge S2 \wedge S3$.

Figure 8:
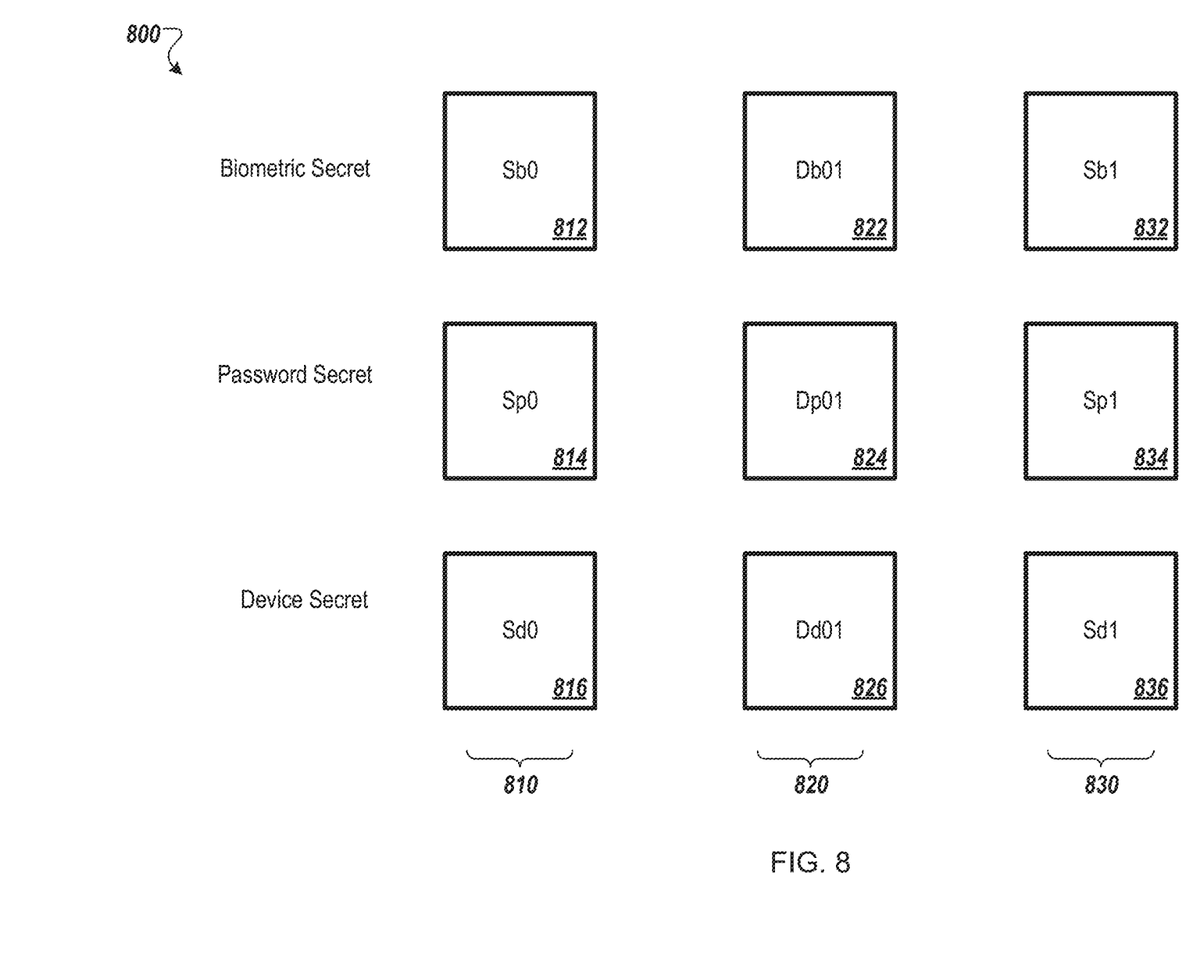
FIG. 8 illustrates an example block diagram for computing a delta based on an owner secret and a receiver secret.

As illustrated in in the diagram 800 in FIG. 8, an owner may transfer a key to a receiver using multiple factors. The secrets 810 held by the owner and the secrets 830 held by the receiver may have a delta 820 that may indicate a difference between the owner's secrets 810 and the receiver's secrets 830. For a biometric scenario, a delta Db01 822 may be computed between a biometric secret Sb0 812, which may be held by the owner, and a biometric secret Sb1 832, which may be held by the receiver. For a password scenario, a delta Dp01 824 may be computed between a password secret Sp0 814, which may be held by the owner, and a password secret Sp1 834, which may be held by the receiver. For a device scenario, a delta Dd01 826 may be computed between a device secret Sd0 816, which may be held by the owner, and a device secret Sd1 836, which may be held by the receiver.

A trusted legal entity may release the deltas when a transfer is to be effectuated. For example, for a legally certified key transfer, a legal heir or a power of attorney may gain access to the key with the aid of a legal certification agent. The owner and the receiver may each have independent keys. For example, the owner may have a key based on a biometric secret Sb0 812, a password secret Sp0 814, and a device secret Sd0 816. The receiver may have a key based on a biometric secret Sb1 832, a password secret Sp1 834, and a device secret Sd1 836. The owner may designate a receiver, and the owner and the receiver may regenerate their secrets (e.g., Sb0 812, Sp0 814, Sd0 816 for the owner and Sb1 832, Sp1 834, and Sd1 836 for the receiver). The secrets (e.g., Sb0 812, Sp0 814, Sd0 816, Sb1 832, Sp1 834, and Sd1 836) may be combined using a difference operator (e.g., XOR, XNOR, or the like) to create the deltas (e.g., Db01 822, Dp01 824, Dd01 826). The deltas (e.g., Db01 822, Dp01 824, Dd01 826) may be digitally signed and recorded by the legal certification agent.

The deltas (e.g., Db01 822, Dp01 824, Dd01 826) do not contain information about the key because the deltas are the differences between two random numbers. As an additional layer of protection, the legal certification agent may encrypt the deltas (e.g., Db01 822, Dp01 824, Dd01 826) so that they are to be decrypted to access. Upon certification of death or POA, the legal certification agent may release the deltas (e.g., Db01 822, Dp01 824, Dd01 826). Deltas (e.g., Db01 822, Dp01 824, Dd01 826) may be used with the receiver secrets (e.g., Sb1 832, Sp1 834, and Sd1 836) to access the owner key without using the owner's biometric, the owner's password, or the owner's device. The delta facilitate the receiver in the regeneration of the owner's secrets (Sb0 812, Sp0 814, Sd0 816).

Alternatively or in addition, a layer of additional protection may include encrypting the deltas (e.g., Db01 822, Dp01 824, Dd01 826) with the receiver symmetric key and subsequently encrypting using a public key of a trusted $3^{rd}$ party. When the transfer condition is certified (e.g., death or POA), the trusted $3^{rd}$ party may decrypt the delta with their private key and provide the delta to the receiver. The receiver may use their symmetric key to decrypt the delta allowing them to apply the delta to gain access to the original key.

To enroll the receiver, the key owner, the receiver, and the $3^{rd}$ party public key may be used. The owner may use multiple factors to recover their secrets and the receiver may use multiple factors to recover their secrets and a corresponding symmetric key. The delta may be computed, encrypted with the receiver symmetric key, and encrypted with the trusted $3^{rd}$ party's public key. The delta may be sent to the trusted $3^{rd}$ party to be recorded.

A method for creating a certified key transfer between parties may include one or more of: (i) compute owner's secrets (e.g., S01, S02, . . . S0N) from owner's user data (e.g., biometric data, password data, or device data), (ii) compute the receiver's secrets (S11, S12, . . . S1N) from receiver supplied user data (e.g., biometric data, password data, or device data), (iii) compute mapping numbers M1 . . . Mn (e.g., auxiliary data) as a difference operation (e.g., XOR, XNOR, or the like) between the owner's secrets and the receiver's secrets, (iv) create the receiver symmetric key Kt from the receiver secrets (S11, S12, . . . S1N), (v) encrypt mapping number M1 . . . Mn using the receiver symmetric key Kt to create encrypted mapping numbers Et(M1 . . . Mn), (vi) encrypt Et(M1 . . . Mn) using the trusted $3^{rd}$ party key Kc to create Ec(Et (M1 . . . Mn)), or (vii) send Ec(Et(M1 . . . Mn)) to the trusted third party for storage.

A method for creating a certified execution of key transfer between parties may include one or more of: (i) trusted $3^{rd}$ party may validate that the conditions for key transfer (e.g., death, POA) have been satisfied, (ii) trusted $3^{rd}$ party may decrypt Ec(Et(M1 . . . Mn)) using its private key to generate Et(M1 . . . Mn), (iii) trusted $3^{rd}$ party may send Et(M1 . . . Mn) to the receiver, (iv) receiver may compute receiver secrets (S11, S12, . . . S1N) from receiver supplied user data (U11, U12, . . . U1N), (v) receiver may compute the receiver owner symmetric key from the receiver secrets S11, S12, . . . S1N, (vi) receiver may decrypt the mapping values (M1 . . . Mn) using the receiver symmetric key Kt, (vii) receiver may compute the owner secrets S01, S02, . . . S0N as the difference operation of the receiver secrets and mapping numbers M1 . . . Mn (e.g., auxiliary data), and (viii) receiver may recreate the owner's key using the owner secrets S01, S02, . . . S0N.

Multiple deltas may be used to create a chain of certification. For examples, an executor and judge may be a chain of certification, or a power of attorney and judge may be a chain of certification. When using multiple deltas, random intermediate points may be selected to bind each delta to. The deltas in the chain of certification may be used to create a correct mapping between the owner and the receiver.

When a recovery key is being generated, the owner key seed and the receiver key seed may be held by the same person.

While the operations have been described using a difference operator, namely exclusive OR and exclusive NOR, any transformation that can determine one of the random numbers from the other random numbers may be used interchangeably.

While this has been defined using key seeds, this can apply to other key types as well such as private keys, symmetric keys, or the like, or for mapping any random number to any other random number.

The creation of the delta may use both the owner and receiver key seeds be present together and can be performed in a secure way. A Trusted Platform Module (TPM) may provide a suitable environment for secure delta creation. Programs that regenerate key seeds from some combination of imported passwords, biometrics, etc. may create the delta internally from the regenerated key seed.

Figure 9:
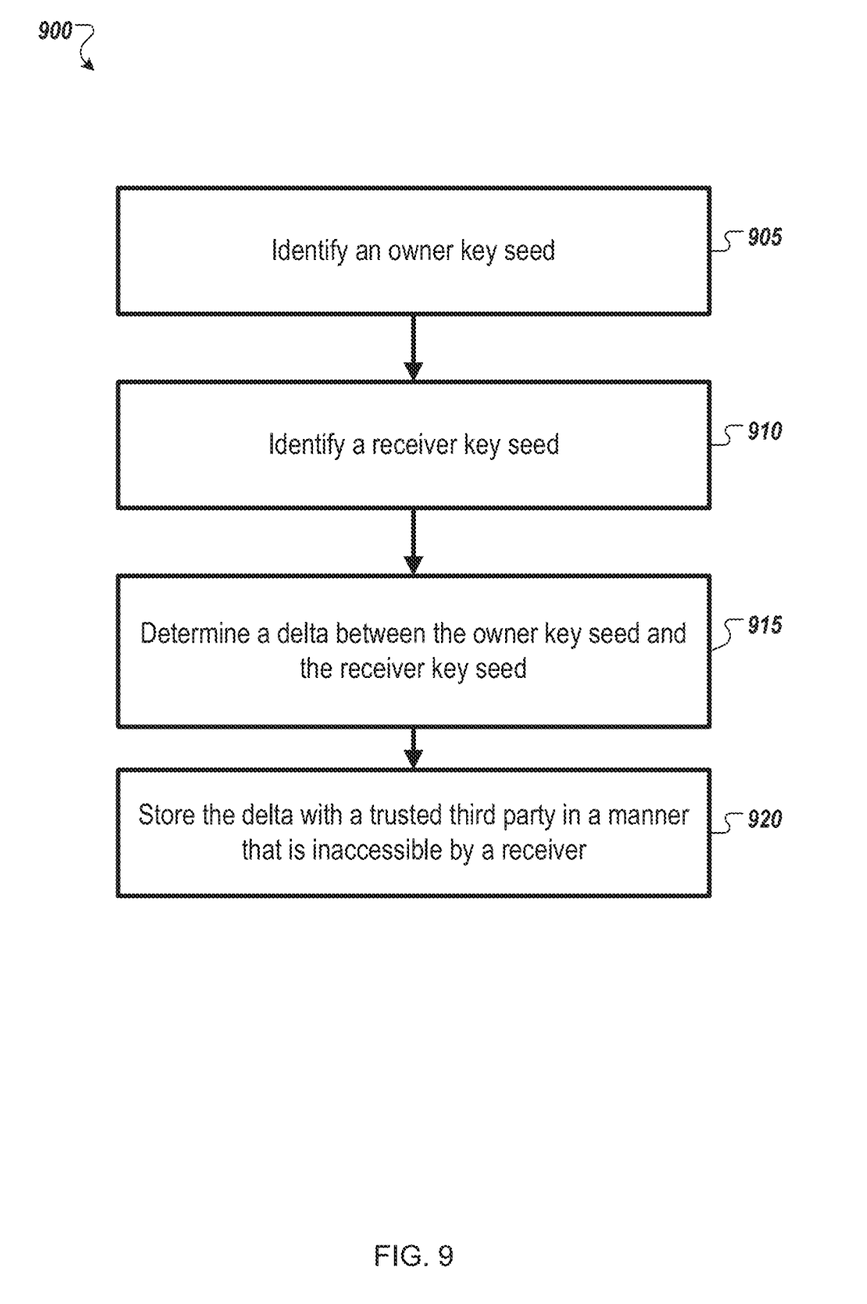
FIG. 9 illustrates an example process flow for key transfer.

FIG. 9 illustrates a process flow of an example method 900 of key transfer, in accordance with at least one example described in the present disclosure. The method 900 may be arranged in accordance with at least one example described in the present disclosure.

Figure 12:
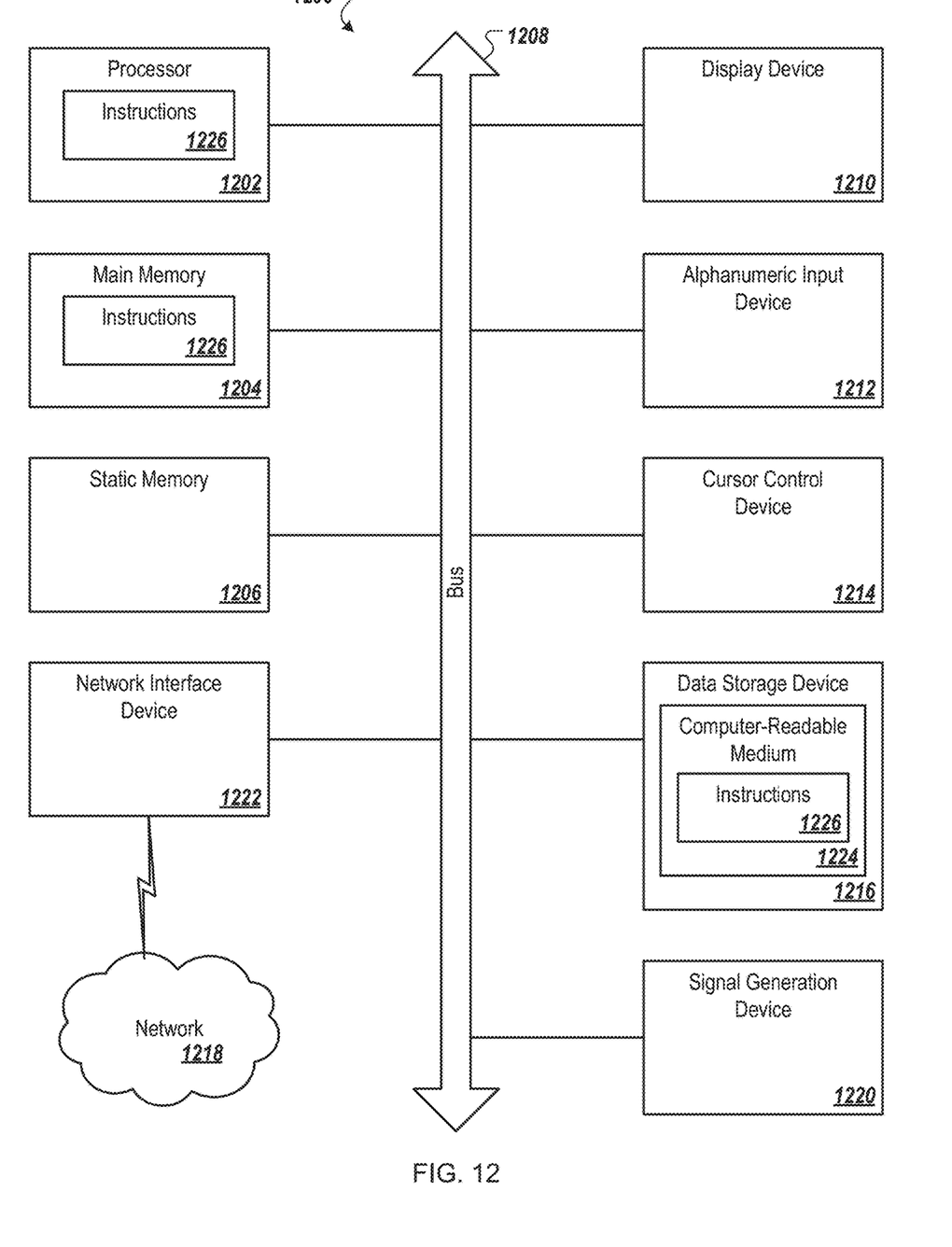
FIG. 12 illustrates a diagrammatic representation of a machine in the example form of a computing device within which a set of instructions, for causing the machine to perform any one or more of the methods discussed herein, may be executed.

The method 900 may be performed by processing logic that may include hardware (circuitry, dedicated logic, etc.), software (such as is run on a computer system or a dedicated machine), or a combination of both, which processing logic may be included in the processing device 1202 of FIG. 12, or another device, combination of devices, or systems.

The method 900 may begin at block 905 where the processing logic may include identifying an owner key seed.

At block 910, the processing logic may include identifying a receiver key seed.

At block 915, the processing logic may include determining a delta between the owner key seed and the receiver key seed.

At block 920, the processing logic may include storing the delta with a trusted third party in a manner that is inaccessible by a receiver, the delta being provided to the receiver based on a transfer condition being satisfied.

Modifications, additions, or omissions may be made to the method 900 without departing from the scope of the present disclosure. For example, in some examples, the method 900 may include any number of other components that may not be explicitly illustrated or described.

Figure 10:
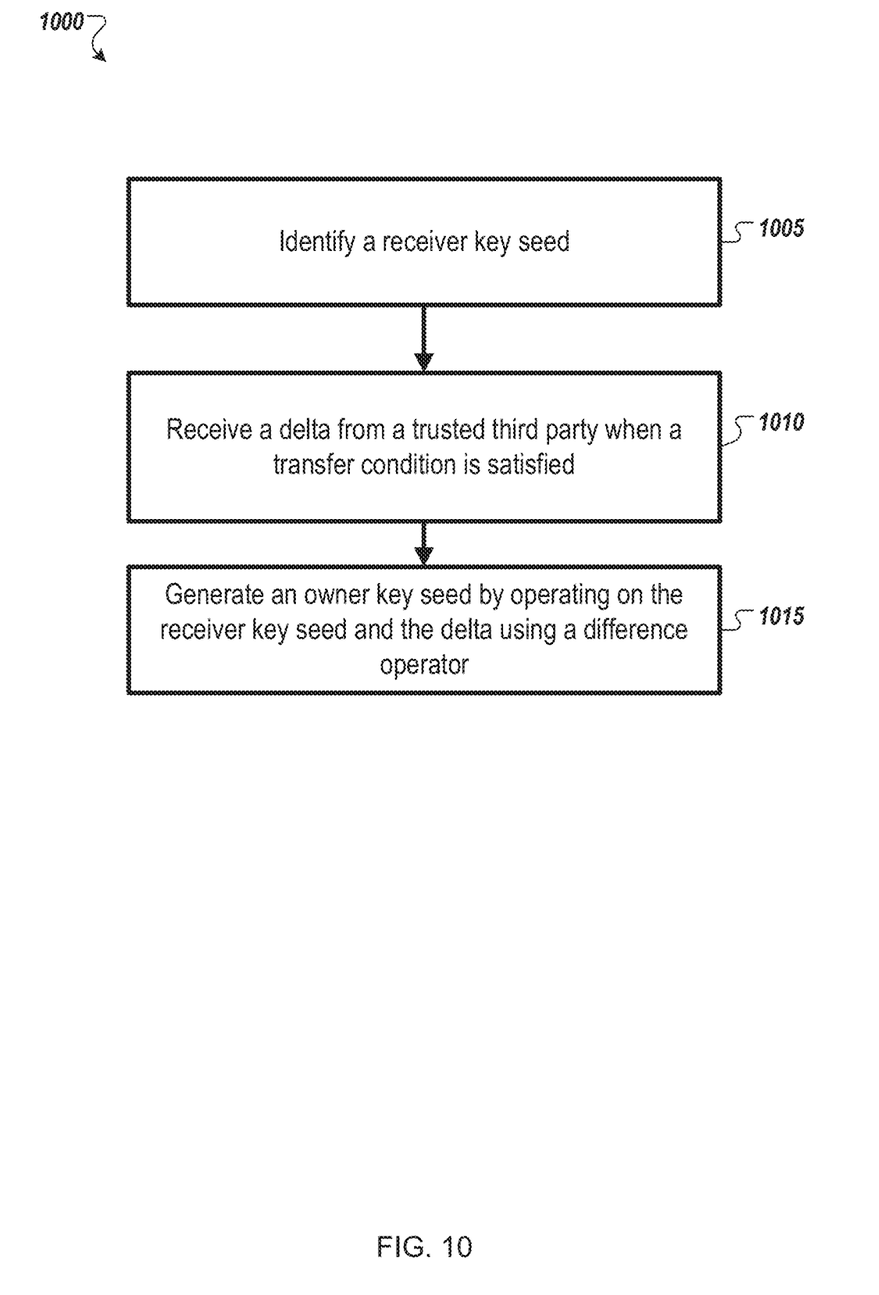
FIG. 10 illustrates an example process flow for key transfer.

FIG. 10 illustrates a process flow of an example method 1000 that may be used for key transfer, in accordance with at least one example described in the present disclosure. The method 1000 may be arranged in accordance with at least one example described in the present disclosure.

The method 1000 may be performed by processing logic that may include hardware (circuitry, dedicated logic, etc.), software (such as is run on a computer system or a dedicated machine), or a combination of both, which processing logic may be included in the processing device 1202 of FIG. 12, or another device, combination of devices, or systems.

The method 1000 may begin at block 1005 where the processing logic may include identifying a receiver key seed.

At block 1010, the processing logic may include receiving a delta from a trusted third party when a transfer condition is satisfied.

At block 1015, the processing logic may include generating an owner key seed by operating on the receiver key seed and the delta using a difference operator.

Modifications, additions, or omissions may be made to the method 1000 without departing from the scope of the present disclosure. For example, in some examples, the method 1000 may include any number of other components that may not be explicitly illustrated or described.

Figure 11:
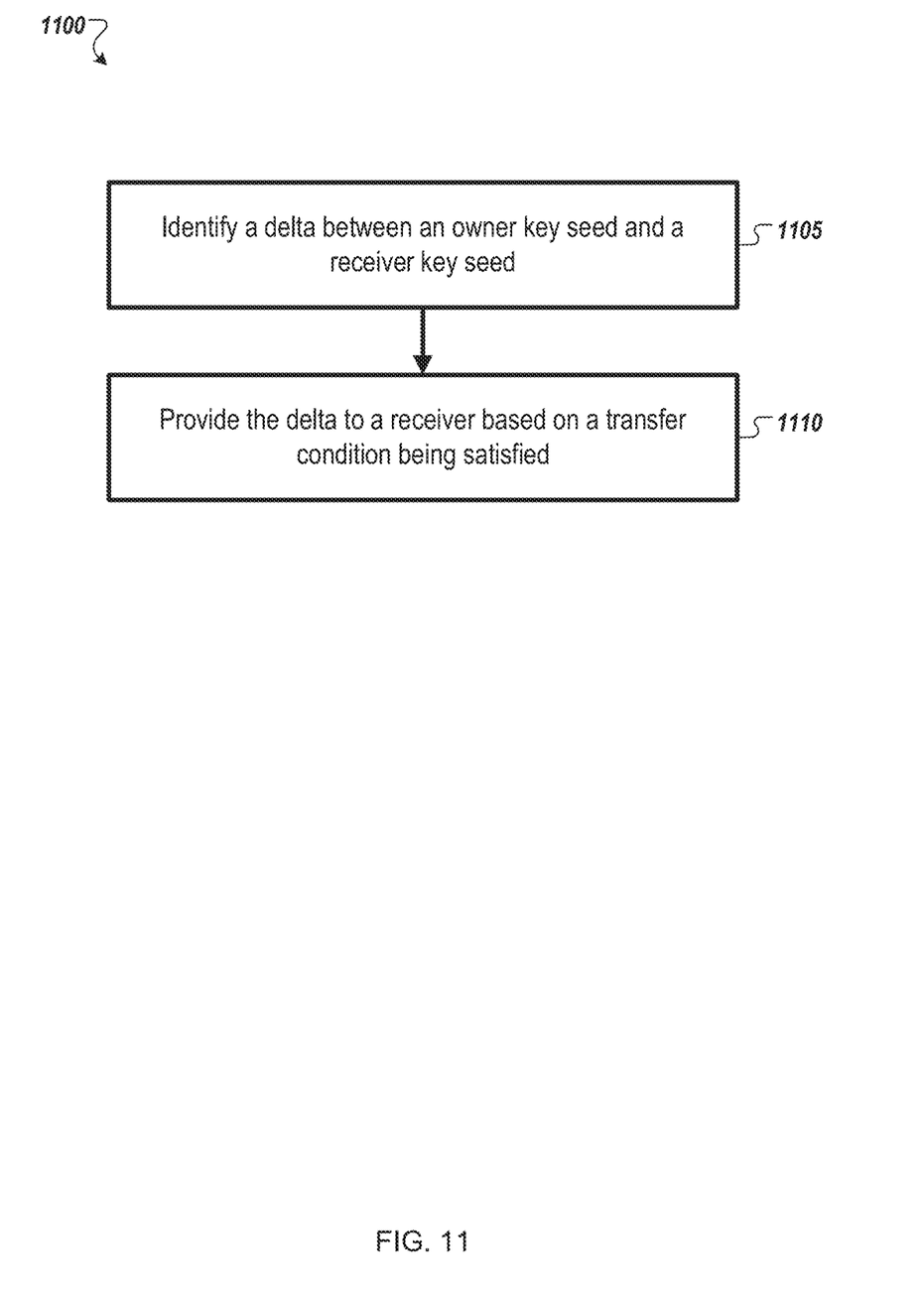
FIG. 11 illustrates an example process flow for key transfer.

FIG. 11 illustrates a process flow of an example method 1100 that may be used for key transfer, in accordance with at least one example described in the present disclosure. The method 1100 may be arranged in accordance with at least one example described in the present disclosure.

The method 1100 may be performed by processing logic that may include hardware (circuitry, dedicated logic, etc.), software (such as is run on a computer system or a dedicated machine), or a combination of both, which processing logic may be included in the processing device 1202 of FIG. 12, or another device, combination of devices, or systems.

The method 1100 may begin at block 1105 where the processing logic may include identifying a delta between an owner key seed and a receiver key seed.

At block 1110, the processing logic may include providing the delta to a receiver based on a transfer condition being satisfied, wherein the delta is operable to generate the owner key seed by operating on the receiver key seed and the delta using a difference operator.

Modifications, additions, or omissions may be made to the method 1000 without departing from the scope of the present disclosure. For example, in some examples, the method 1000 may include any number of other components that may not be explicitly illustrated or described.

For simplicity of explanation, methods and/or process flows described herein are depicted and described as a series of acts. However, acts in accordance with this disclosure may occur in various orders and/or concurrently, and with other acts not presented and described herein. Further, not all illustrated acts may be used to implement the methods in accordance with the disclosed subject matter. In addition, those skilled in the art will understand and appreciate that the methods may alternatively be represented as a series of interrelated states via a state diagram or events. Additionally, the methods disclosed in this specification are capable of being stored on an article of manufacture, such as a non-transitory computer-readable medium, to facilitate transporting and transferring such methods to computing devices. The term article of manufacture, as used herein, is intended to encompass a computer program accessible from any computer-readable device or storage media. Although illustrated as discrete blocks, various blocks may be divided into additional blocks, combined into fewer blocks, or eliminated, depending on the desired implementation.

FIG. 12 illustrates a diagrammatic representation of a machine in the example form of a computing device 1200 within which a set of instructions, for causing the machine to perform any one or more of the methods discussed herein, may be executed. The computing device 1200 may include a mobile phone, a smart phone, a netbook computer, a rackmount server, a router computer, a server computer, a personal computer, a mainframe computer, a laptop computer, a tablet computer, a desktop computer etc., within which a set of instructions, for causing the machine to perform any one or more of the methods discussed herein, may be executed. In alternative examples, the machine may be connected (e.g., networked) to other machines in a local area network (LAN), an intranet, an extranet, or the Internet. The machine may operate in the capacity of a server machine in client-server network environment. The machine may include a personal computer (PC), a set-top box (STB), a server, a network router, switch or bridge, or any machine capable of executing a set of instructions (sequential or otherwise) that specify actions to be taken by that machine. Further, while only a single machine is illustrated, the term "machine" may also include any collection of machines that individually or jointly execute a set (or multiple sets) of instructions to perform any one or more of the methods discussed herein.

The example computing device 1200 includes a processing device (e.g., a processor) 1202, a main memory 1204 (e.g., read-only memory (ROM), flash memory, dynamic random access memory (DRAM) such as synchronous DRAM (SDRAM)), a static memory 1206 (e.g., flash memory, static random access memory (SRAM)) and a data storage device 1216, which communicate with each other via a bus 1208.

Processing device 1202 represents one or more general-purpose processing devices such as a microprocessor, central processing unit, or the like. More particularly, the processing device 1202 may include a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 1202 may also include one or more special-purpose processing devices such as an application specific integrated circuit (ASIC), a field programmable gate array (FPGA), a digital signal processor (DSP), network processor, or the like. The processing device 1202 is configured to execute instructions 1226 for performing the operations and steps discussed herein.

The computing device 1200 may further include a network interface device 1222 which may communicate with a network 1218. The computing device 1200 also may include a display device 1210 (e.g., a liquid crystal display (LCD) or a cathode ray tube (CRT)), an alphanumeric input device 1212 (e.g., a keyboard), a cursor control device 1214 (e.g., a mouse) and a signal generation device 1220 (e.g., a speaker). In at least one example, the display device 1210, the alphanumeric input device 1212, and the cursor control device 1214 may be combined into a single component or device (e.g., an LCD touch screen).

The data storage device 1216 may include a computer-readable storage medium 1224 on which is stored one or more sets of instructions 1226 embodying any one or more of the methods or functions described herein. The instructions 1226 may also reside, completely or at least partially, within the main memory 1204 and/or within the processing device 1202 during execution thereof by the computing device 1200, the main memory 1204 and the processing device 1202 also constituting computer-readable media. The instructions may further be transmitted or received over a network 1218 via the network interface device 1222.

While the computer-readable storage medium 1226 is shown in an example to be a single medium, the term "computer-readable storage medium" may include a single medium or multiple media (e.g., a centralized or distributed database and/or associated caches and servers) that store the one or more sets of instructions. The term "computer-readable storage medium" may also include any medium that is capable of storing, encoding or carrying a set of instructions for execution by the machine and that cause the machine to perform any one or more of the methods of the present disclosure. The term "computer-readable storage medium" may accordingly be taken to include, but not be limited to, solid-state memories, optical media and magnetic media.

A number of implementations have been described. Nevertheless, it will be understood that various modifications may be made without departing from the spirit and scope of the disclosure. Accordingly, other implementations are within the scope of the following claims.

In accordance with common practice, the various features illustrated in the drawings may not be drawn to scale. The illustrations presented in the present disclosure are not meant to be actual views of any particular apparatus (e.g., device, system, etc.) or method, but are merely idealized representations that are employed to describe various examples of the disclosure. Accordingly, the dimensions of the various features may be arbitrarily expanded or reduced for clarity. In addition, some of the drawings may be simplified for clarity. Thus, the drawings may not depict all of the components of a given apparatus (e.g., device) or all operations of a particular method.

Terms used herein and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, it is understood that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc. For example, the use of the term "and/or" is intended to be construed in this manner.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

Additionally, the use of the terms "first," "second," "third," etc., are not necessarily used herein to connote a specific order or number of elements. Generally, the terms "first," "second," "third," etc., are used to distinguish between different elements as generic identifiers. Absence a showing that the terms "first," "second," "third," etc., connote a specific order, these terms should not be understood to connote a specific order. Furthermore, absence a showing that the terms first," "second," "third," etc., connote a specific number of elements, these terms should not be understood to connote a specific number of elements. For example, a first widget may be described as having a first side and a second widget may be described as having a second side. The use of the term "second side" with respect to the second widget may be to distinguish such side of the second widget from the "first side" of the first widget and not to connote that the second widget has two sides.

All examples and conditional language recited herein are intended for pedagogical objects to aid the reader in understanding the invention and the concepts contributed by the inventor to furthering the art, and are to be construed as being without limitation to such specifically recited examples and conditions. Although embodiments of the present disclosure have been described in detail, it should be understood that the various changes, substitutions, and alterations could be made hereto without departing from the spirit and scope of the present disclosure.

What is claimed is:

1. A method, comprising:
   identifying an owner key seed;
   identifying a receiver key seed;
   determining a difference between the owner key seed and the receiver key seed;
   storing the difference between the owner key seed and the receiver key seed with a trusted third party in a manner that is inaccessible by a receiver; and
   causing the difference to be provided to the receiver based on a determination that a transfer condition is satisfied.

2. The method of claim 1, further comprising:
   determining the difference between the owner key seed and the receiver key seed by operating on the owner key seed and the receiver key seed using a difference operator.

3. The method of claim 1, further comprising:
   generating the owner key seed by operating on the receiver key seed and the difference using a difference operator.

4. The method of claim 2, wherein the difference operator is one or more of an XOR operator or an XNOR operator.

5. The method of claim 1, further comprising:
   encrypting the difference using one or more of a receiver key or a trusted third party key.

6. The method of claim 1, further comprising:
   decrypting the difference using one or more of a receiver key or a trusted third party key.

7. The method of claim 1, further comprising:
   identifying one or more trusted third party secrets;
   determining the difference between the owner key seed, the receiver key seed, and the one or more trusted third party secrets; and
   generating the owner key seed by operating on the receiver key seed, the difference, and the one or more trusted third party secrets.

8. The method of claim 1, further comprising:
   determining the difference between the owner key seed and the receiver key seed using a trusted platform module.

9. The method of claim 1, further comprising:
   determining the difference from a regenerated key seed.

10. The method of claim 1, wherein the owner key seed and the receiver key seed are held by the same person when generating a recovery key.

11. A method, comprising:
    identifying a receiver key seed;
    receiving difference information from a trusted third party when a transfer condition is satisfied;
    generating an owner key seed by operating on the receiver key seed and the difference information using a difference operator; and
    granting an access to an object in view of the owner key seed.

12. The method of claim 11, wherein the difference operator is one or more of an XOR operator or an XNOR operator.

13. The method of claim 11, further comprising decrypting the difference information using one or more of a receiver key or a trusted third party key.

14. The method of claim 11, further comprising:
    identifying one or more trusted third party secrets;
    determining the difference information between the owner key seed, the receiver key seed, and the one or more trusted third party secrets; and
    generating the owner key seed by operating on the receiver key seed, the difference information, and the one or more trusted third party secrets.

15. The method of claim 11, further comprising:
    determining the difference information between the owner key seed and the receiver key seed using a trusted platform module.

16. The method of claim 11, further comprising:
    determining the difference information from a regenerated key seed.

17. The method of claim 11, wherein the owner key seed and the receiver key seed are held by the same person when generating a recovery key.

18. A method, comprising:
    identifying difference information between an owner key seed and a receiver key seed; and providing the difference information to a receiver based on a transfer condition being satisfied, wherein the difference information is operable to generate the owner key seed by operating on the receiver key seed and the difference information using a difference operator, the owner key seed for use to access an object.

19. The method of claim 18, further comprising encrypting the difference information using one or more of a receiver key or a trusted third party key.

20. The method of claim 18, wherein the difference operator is one or more of an XOR operator or an XNOR operator.

* * * * *